INVENTORS.
NORBERT R. BALZER,
ALBERT E. HALA &
GEORGE C. NEBESAR

BY *Tilberry & Body*

ATTORNEYS

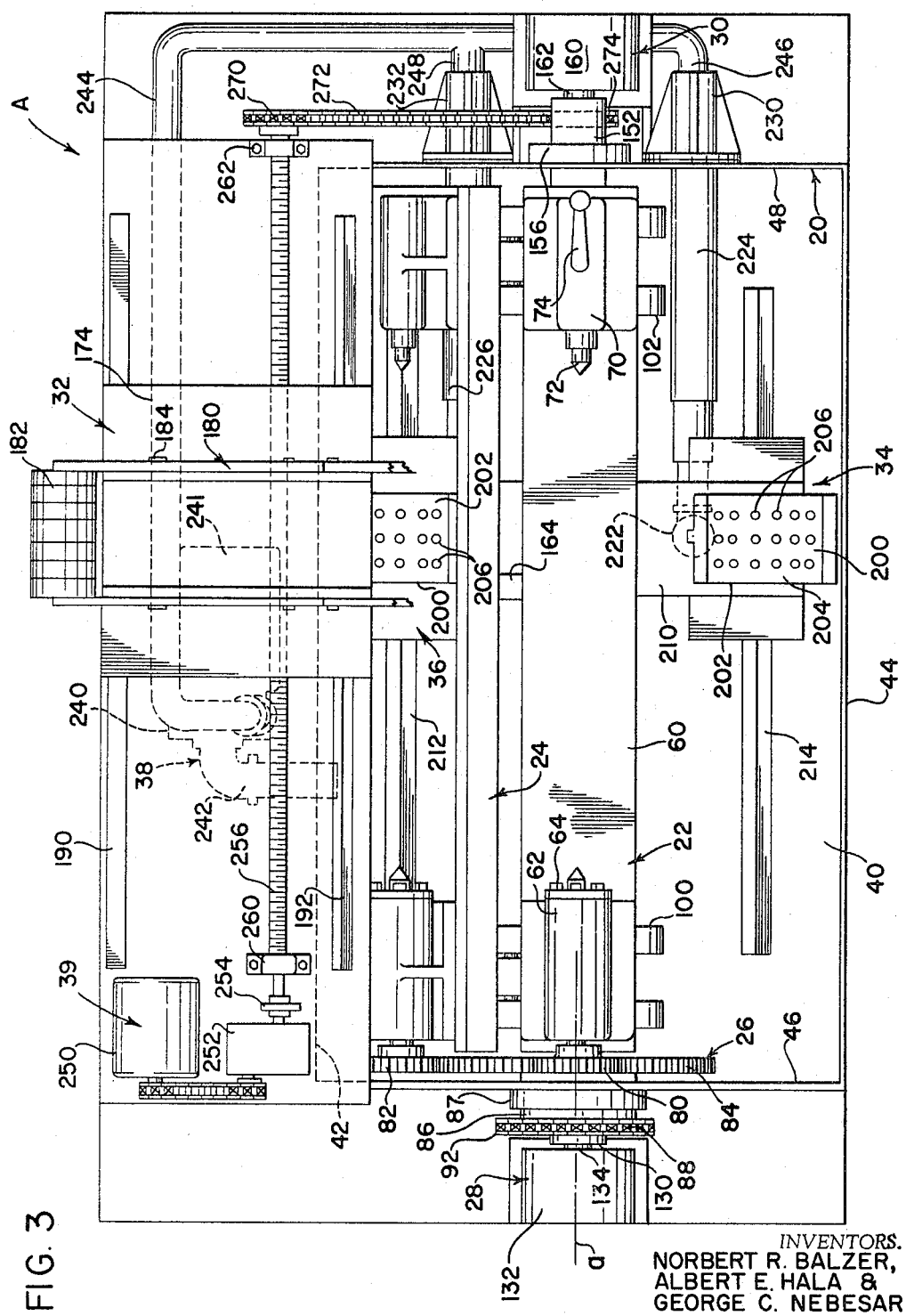

United States Patent Office 3,383,100
Patented May 14, 1968

3,383,100
APPARATUS FOR HARDENING SPACED BEARING SURFACES ON A SHAFT-LIKE WORKPIECE
Norbert R. Balzer, Parma, Albert E. Hala, North Royalton, and George C. Nebesar, Cleveland, Ohio, assignors to Park-Ohio Industries, Inc., a corporation of Ohio
Filed Oct. 11, 1965, Ser. No. 494,358
11 Claims. (Cl. 266—4)

The present invention pertains to the art of induction heating and more particularly to an apparatus for hardening spaced bearing surfaces on a shaft-like workpiece.

This invention is particularly applicable to hardening the bearing surfaces on the throws of a crankshaft, by first inductively heating the bearing surfaces and then quench hardening the same, and it will be described with particular reference thereto; however, it will be appreciated that the invention has much broader applications and may be used to harden spaced surfaces on other shaft-like workpieces, such as cam shafts and the like.

A crankshaft, of the type used in internal combustion engines, generally includes a plurality of axially spaced, bearing surfaces which must be case hardened to provide the wear characteristics required for prolonged use. A variety of machines or apparatus have been used for hardening these spaced bearing surfaces; however, for economy and uniform hardening, most of these prior apparatus included a support for holding the ends of the crankshaft, a means for rotating the crankshaft around its axis, and an inductor adapted to encircle all, or part, of a bearing surface as the crankshaft was being rotated. The inductor was energized by a high frequency power source so that the bearing surface adjacent the inductor was inductively heated to a quench hardening temperature. Thereafter, the heated bearing surface was quenched by spraying the surface with a quenching fluid or by dipping the complete crankshaft into a tank filled with a quenching fluid. After one bearing surface was hardened in this manner, the crankshaft was again supported and rotated so that another bearing surface could be heated and quenched. This procedure was repeated until all bearing surfaces were hardened, and then another crankshaft was processed in a similar fashion.

Because the heating cycle was substantially less than the quenching cycle the productivity of these prior apparatus was limited by the time required for quenching each bearing surface. To overcome this disadvantage of the prior apparatus for hardening the spaced bearing surfaces of a crankshaft, it has been proposed to mount a plurality of crankshafts on a single indexing spindle so that one bearing surface was heated while one or more of the other bearing surfaces were being quenched. Although this type of apparatus did decrease the combined cycle time for heating and quenching the bearing surfaces, the operation of these apparatus was somewhat inflexible because all crankshafts were indexed in unison by the spindle. Sufficent quenching of the bearing surfaces was not obtained in many instances without decreasing the rate at which the spindle was indexed. Consequently, the time between indexes was greater than the actual time required for heating each bearing surface. This was especially true when the crankshafts were relatively large and bulky which substantially increased the mass to be quenched and, thereby, increased the total time required for quenching previously heated bearing surfaces.

These and other disadvantages of prior apparatus for hardening the axially spaced, bearing surfaces on a crankshaft are completely overcome by the present invention which is directed toward an apparatus for hardening these spaced bearing surfaces wherein two crankshafts may be simultaneously processed without requiring movement of the separate crankshafts in unison.

In accordance with the present invention, there is provided an apparatus for hardening the bearing surfaces of a shaft-like workpiece having an axis and axially spaced bearing surfaces. This apparatus comprises a tank to be filled to a given level with a quenching fluid; an inductor having a contour matching the bearing surfaces for heating the surfaces when the inductor is energized by a high frequency power source; a first and a second workpiece support, each of the supports including means for holding one of the workpieces and means for rotating the held workpiece about its axis; and, means for moving each of the supports independently between a first position with the workpiece beneath the given level and a second position with the workpiece above the given level. There is also provided a means for moving the inductor into heating relationship with one of the bearing surfaces of one of the workpieces when that workpiece is above the given level.

By constructing an apparatus in accordance with the present invention, two separate shaft-like workpieces having axially spaced bearing surfaces may be mounted in the apparatus at one time; however, each workpiece is independently controlled so that the optimum heating and quenching cycle may be used without directly tying the movement of one workpiece between the heating and quenching positions with a similar movement of the other workpiece.

The primary object of the present invention is the provision of an apparatus for hardening the axially spaced bearing surfaces of a crankshaft, or a similar shaft-like workpiece, which apparatus receives two workpieces at a time and requires less overall cycling time than prior apparatus of this general nature.

Another object of the present invention is the provision of an apparatus for hardening the axially spaced bearing surfaces of a crankshaft, or a similar shaft-like workpiece, which apparatus receives two workpieces at a time and independently moves the separate workpieces between their heating and their quenching positions.

Still another object of the present invention is the provision of an apparatus for hardening the axially spaced bearing surfaces of a crankshaft, or a similar shaft-like workpiece, which apparatus receives two workpieces at a time and includes a novel quenching accessory to decrease the required quenching time for the heated bearing surfaces.

These and other objects and advantages will become apparent from the following description used to illustrate the preferred embodiment of the invention as read in connection with the accompanying drawings in which.

Figure 1:
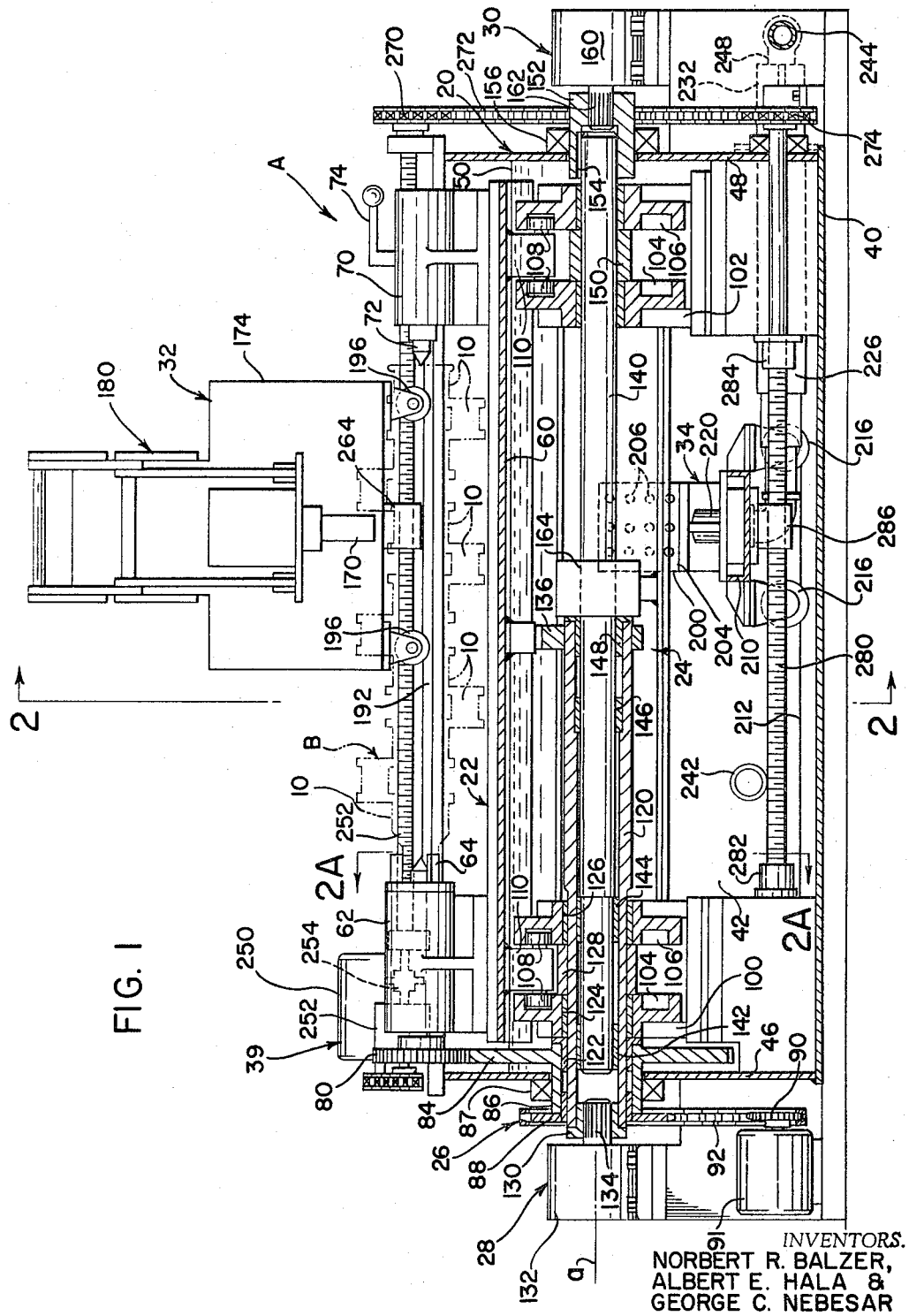
FIGURE 1 is a cross-sectional, front elevational view showing, somewhat schematically, the preferred embodiment of the present invention.

Referring now to the drawings wherein the showings are for the purpose of illustrating a preferred embodiment of the invention only and not for the purpose of limiting same, the figures show an apparatus A for hardening the spaced bearing surfaces 10 of crankshaft B, shown in phantom lines in FIGURE 1. The crankshaft or workpiece may take a variety of structural embodiments; however, an internal combustion crankshaft is illustrated for the purpose of describing the present invention. Apparatus A includes a quench tank 20, separate workpiece receiving supports 22, 24 and a mechanism 26 for rotating the workpieces while they are mounted in the supports. To index the separate workpiece support 22, 24 into and out of the quench fluid within tank 20, apparatus A includes indexing mechanisms 28, 30, respectively. There is also provided a heating unit 32, quenching agitators 34, 36 located within the quench tank 20, and a quench fluid circulating system 38 used for circulating an appropriate quenching fluid, such as oil or water, from the tank 20 through the agitators 34, 36. Drive 39 is utilized for moving the heating unit 32 and quenching agitators 34, 36 in unison, in a manner to be hereinafter described in detail.

Referring now to tank 20, the tank includes a bottom 40, side walls 42, 44 and end walls 46, 48 so that a quenching fluid can be maintained within the tank to a selected level 50. The quenching fluid is utilized for quenching the bearing surfaces 10 after they have been heated to the quench hardening temperature.

Figure 2:
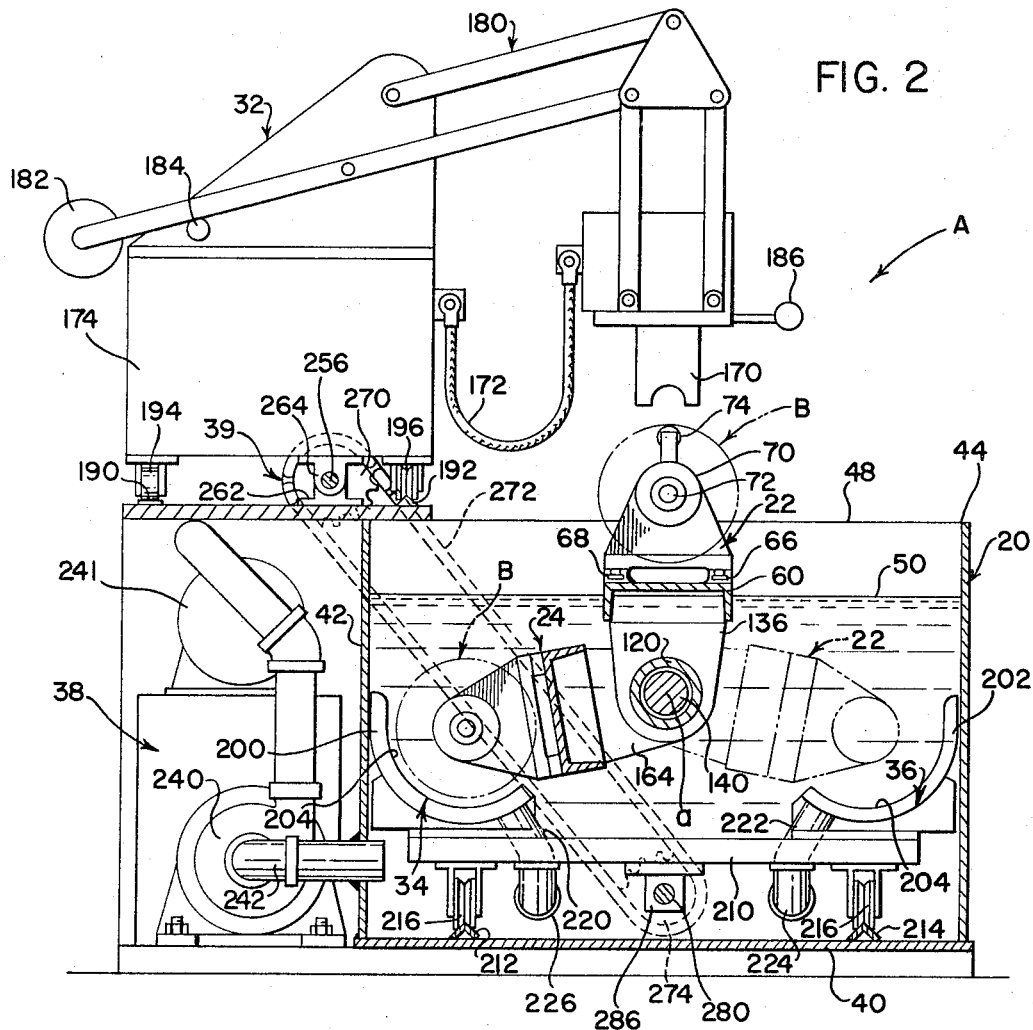
FIGURE 2 is a cross-sectional view taken generally along line 2—2 of FIGURE 1.

Work supports 22, 24 are substantially identical; therefore, only support 22 will be described in detail, and it should be appreciated that this description will apply equally to the other work support 24. These supports include an elongated base 60 having at one end thereof a headstock 62 with an internal spindle, not shown, for supporting the chuck 64 and its drive. The tailstock is adjustable longitudinally of base 60 by T bolts received within slots 66, 68, as shown in FIGURE 2. At the other end of the elongated base 60, the support 22 is provided with a tailstock 70 having a live center 72 aligned with chuck 64. Handle 74 is used to retract live center 72 so that the workpiece B may be loaded and unloaded from the support 22 in a transverse direction.

Referring now to the workpiece rotating mechanism 26, this mechanism includes pinion or driven gears 80, 82 which are drivingly secured onto the spindles within the headstocks 62 of workpiece supports 22, 24, respectively. These driven gears mesh with drive gear 84 having a hub 86 rotatably supported within bearing 87 mounted on and fixed to the end wall 46 of tank 20. Drive gear 84 is rotated by a sprocket 88 secured onto hub 86 and a sprocket 90 driven by motor 91. The sprockets 88 and 90 are connected by a chain 92, best shown in FIGURE 1.

Indexing mechanisms 28 and 30 are utilized for indexing the supports 22, 24, respectively. Before these mechanisms are described in detail, the structure for guiding movement of supports 22, 24 will be described. In accordance with the illustrated embodiment of the present invention, this guide structure includes spaced support stands 100, 102 mounted within the quench tank 20. Each stand includes aligned annular recesses 104, 106 which combine to form an arcuate guide for rollers 108 secured by lugs 110 onto the lower portion of base 60. It is appreciated that this support of each base 60 is substantially the same; therefore, the showing in FIGURE 1 is equally applicable to the support 24. The arcuate guides formed by recesses 104, 106 are generally concentric with axis $a$; therefore, as the supports 22, 24 move along the arcuate guides the gears 80, 82 remain meshed with the drive gear 84. In this manner, the workpieces B may be roated by the driven gears 80, 82, irrespective of the angular position of the supports 22, 24.

Figure 2A:
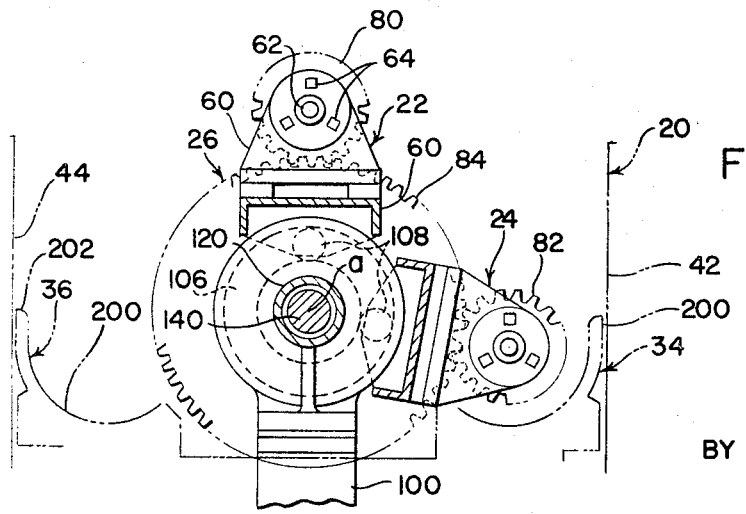
FIGURE 2A is a schematic view illustrating certain structural details of the preferred embodiment of the present invention as shown in FIGURES 1 and 2 and taken along line 2A—2A of FIGURE 1; and, FIGURE 3 is a top view showing the preferred embodiment of the present invention.

Indexing mechanism 28 includes, as a primary element, a hollow shaft 120 rotatably received within spaced bearings 122, 124 and 126. A locator ring 128 axially aligns the hollow shaft 120 with respect to the stand 100. A cap 130 is fixedly secured onto the end of shaft 120 so that a hydraulic actuator 132 having an output indexing shaft 134 can rotate the shaft 120 within the spaced bearings. At the end of the shaft 120 opposite actuator 132 there is provided a lug 136 for securing the shaft onto the lower portion of base 60. By indexing the shaft 134, the workpiece support 22 may be moved between a heating position above the quench fluid level 50 and a quenching position below the level 50. This is best shown in FIGURES 2 and 2A.

Referring now to the indexing mechanism 30 for moving the support 24, this mechanism includes a shaft 140 telescopically received within hollow shaft 120, as is best shown in FIGURE 1. The shaft 140 is mounted in axially spaced bearings 142, 144, 146 and 148 to rotate about axis $a$. To secure the shaft in an axial direction, the shaft is provided with a locator ring 150 which is locked within the stand 102 in a manner similar to the locator ring 128 of shaft 120. A cap 152 is fixedly secured onto shaft 140 by a key 154 so that rotation of the cap will cause a corresponding rotation of shaft 140. Bearing 156 rotatably secures the cap 152 with respect to end wall 48 to further support the shaft 140 for rotational movement. It is appreciated that a seal must be provided at bearings 87, 156 so that quenching fluid will not flow from the tank 20 in the area of these bearings when level 50 is higher than the bearings. A hydraulic actuator 160 having an output indexing shaft 162 concentric with axis $a$ is utilized for rotating the shaft 140 to move the support 24 between an upper heating position and a lower quenching position. In order to accomplish this rotation or indexing of the support 24, the shaft 140 is provided with a lug 164 secured onto base 60 of the support 24.

The mechanisms 28, 30 selectively move the workpiece supports 22, 24 between the heating position and the quenching position without interrelationship between these two indexing mechanisms. Of course, appropriate controls are provided so that the individual workpiece supports are not moved into the heating position at the same time.

Referring now to FIGURES 1 and 2, the heating unit 32 includes an inductor 170 which is only schematically illustrated. A variety of inductors could be used so long as the inductor has a contour to match the bearing surfaces 10 of crankshaft B. In practice, the inductor 170 encircles approximately half of the bearing surface so that the workpiece may be rotated to heat the complete bearing surface uniformly. Leads 172 connect the inductor onto a transformer within housing 174 so that the transformer can be driven by a high frequency power source, not shown, to energize the inductor 170 and cause the required heating of the bearing surfaces 10.

During rotation of the workpiece B, the inductor 170 must move slightly in both the vertical and horizontal directions. To accomplish this compound movement, a pantograph lever system 180 is illustrated. The operation of this lever system is well known in the art, and a further description thereof is not required. A counterbalance 182 is provided on the lever system 180 so that the counterbalance will draw the lever system against a stop 184 when the inductor is raised from its heating position. An appropriately positioned handle 186 is used to move the inductor 170 into the heating position, and when in this position, the counterbalance does not impart a sufficient upward force to raise the inductor. After the heating operation, the inductor is raised by a cylinder, not shown, and the counterbalance assists to reduce the lifting force required. In accordance with the illustrated embodiment of the invention, the transformer housing 174 is supported on parallel tracks 190, 192. Wheels 194, 196 allow longitudinal movement of the heating unit 32 with respect to the workpiece B so that the inductor 170 may be accurately positioned directly over the bearing surface to be heated. By providing a rib on track 192 and a corresponding annular recess on wheel 196, the heating unit 32 can only move in a direction parallel to the axis of the workpiece B mounted within the apparatus A.

The quenching agitators 34, 36 are used to increase the turbulence adjacent the previously heated bearing surfaces 10. In this manner, the quenching rate of these surfaces is increased. In accordance with the preferred embodiment of the present invention, these agitators include heads 200, 202 having contoured surfaces 204 with a plurality of orifices 206. The surfaces 204 are generally concentric with the axis of the workpiece within the supports 22, 24, and they are spaced slightly from the workpiece so that quenching fluid flowing from orifices 206 causes a turbulence adjacent the bearing surface being quenched. The width of surfaces 204 is substantially greater than the axial length of the bearing surfaces 10 being quenched. In this manner, movement of the agitators 34, 36 from alignment with one bearing surface will continue to agitate the quenching fluid in the vicinity of the next adjacent bearing surface. The purpose of this increased width will be hereinafter described in detail.

The heads 200, 202 are supported onto a base 210 reciprocally mounted within tank 20 by rails 212, 214 and wheels 216. The rails and wheels are contoured so that the base 210 moves only in a direction parallel to the direction of movement of the heating unit 32. Quenching fluid is directed into heads 200, 202 by inlet pipes 220, 222, respectively. Quenching fluid is introduced into pipes 220, 222 by telescoping conduits 224, 226, respectively. By providing the telescoping conduits, quenching fluid can be introduced into the agitator heads irrespective of the axial position of these leads within tank 20. As shown in FIGURE 3, nipples 230, 232 are connected onto the conduits 224, 226 and are sealed with respect to the end wall 48 so that quench fluid does not leak from the tank at the opening provided for the telescoping conduits.

The quenching fluid circulating system 38 includes a pump 240 driven by motor 241. An intake pipe 242 directs quenching fluid from tank 20 to the pump, and outlet conduit 244 connects the discharge of pump 240 to taps 246, 248. In this manner, quenching fluid is communicated with the telescoping conduits 224, 226 and with orifices 206 to agitate the quenching fluid.

Referring now to the drive 39 for the heating unit 32 and the quenching agitators 34, 36 this drive includes a motor 250 adapted to drive a speed reducer 252 connected by a flexible coupling and/or torque responsive clutch 254 onto the feed screw 256. This feed screw has axially spaced journals 260, 262, and extends through nut 264 fixedly secured on the heating unit 32. Thus, rotation of the feed screw 256 by motor 250 causes longitudinal movement of the heating unit 32 along tracks 190, 192. At the rearwardmost end of the feed screw 256 there is provided a sprocket 270 connected by a chain 272 with a sprocket 274. In this manner, rotation of the feed screw 256 causes a corresponding rotation of the sprocket 274. A longitudinally extending feed screw 280 is fixedly secured onto the sprocket and is secured with respect to the tank 20 by spaced journals 282, 284. By providing a nut 286 on the base 210 of agitators 34, 36, rotation of the feed screw 280 by sprocket 274 causes longitudinal movement of the quench agitators 34, 36.

By selecting appropriate mechanical elements, the heating unit 32 moves in unison with the quench agitators 34, 36 and the heads 200, 204 are directly in line with the inductor 170 at all times. Consequently, after the inductor 170 has heated a particular bearing surface 10, the workpiece is moved into the quenching position with one of the agitators closely spaced from the previously heated surface. This provides an increased quenching efficiency and reduces the quenching time. As mentioned before, the surfaces 204 are substantially wider than the surfaces 10. Consequently, when the heating unit 32 is moved axially to align inductor 170 with the next bearing surfaces, the quenching heads 200, 202 are still adjacent the previously heated bearing surfaces. By this arrangement, movement of the heating unit does not prevent the agitators 34, 36 from agitating the quenching fluid adjacent a bearing surface which may not yet be completely quenched.

The operation of apparatus A is clearly apparent from the description of the apparatus. A workpiece B is positioned within support 22 and the inductor 170 is positioned directly above the first bearing surface to be heated. Mechanism 26 rotates the workpiece as the inductor heats this first bearing surface. Thereafter, the indexing mechanism 28 moves the workpiece into the tank 20 below level 50, and the workpiece within the support 24 is moved into the heating position above level 50. The inductor 170 then inductively heats the bearing surface of the other workpiece. Thereafter, the second workpiece is indexed by mechanism 30 into the quenching position. At this time, the indexing mechanism 28 raises the first workpiece back into the heating position and motor 250 moves the heating unit 32 axially until inductor 170 is aligned with the next bearing surface to be heated. Because of the width of head 202, the bearing surface of the second workpiece being quenched is not taken from the influence of agitator 34. The heating and quenching operation takes place in sequence until all bearing surfaces of both workpieces are heated and quench hardened. Thereafter, the workpieces are removed from the apparatus A and two new workpieces are inserted for processing.

It is seen that the indexing mechanisms 28, 30 operate independently so that the movement of one workpiece receiving supports 22, 24 is not dependent upon a corresponding movement of the other workpiece receiving support. This substantially increases the overall versatility of apparatus A and allows the operator to control the apparatus in a manner which allows economic processing of the workpieces.

The present invention has been described in connection with certain structural embodiments; however, it is appreciated that various changes may be made in these embodiments without departing from the intended spirit and scope of the present invention as defined in the appended claims.

Having thus defined our invention, we claim:

1. An apparatus for hardening the bearing surfaces of a shaft-like workpiece having an axis and axially spaced bearing surfaces, said apparatus comprising: a tank to be filled to a given level with a quenching fluid, an inductor having a contour matching said bearing surfaces for heating said surfaces when said inductor is energized by a high frequency power source, first and second independently movable workpiece supports, each of said supports including means for holding one of said workpieces and means for rotating said held workpiece about its axis, means for moving each of said supports independently between a first position with said workpiece beneath said given level and a second position with said workpiece above said given level, and means for moving said inductor into heating relationship with said workpiece when said workpiece is above said given level.

2. An apparatus as defined in claim 1 wherein each of said supports is pivotally mounted on the same axis and means for selectively pivoting said supports to move said workpiece between said first and second positions.

3. An apparatus as defined in claim 2 including two spaced arcuate guides, each of said guides being concentric with said same axis and each of said supports including a pair of support members with one support member of each support riding in one of said arcuate guides and the other support member of each support riding in the other of said arcuate guides.

4. An apparatus as defined in claim 3 wherein said workpiece rotating means of each support comprises a driven gear concentric with said workpiece support axis and fixed with respect to said workpiece, and a drive gear concentric with said same axis, and motor means for rotating said drive gear whereby said driven gears and workpiece are rotated.

5. An apparatus as defined in claim 2 wherein said support pivoting means includes two telescoped shafts extending along said same axis, each of said shafts connected onto a different one of said supports, and means on each shaft for selectively rotating each shaft independent of the other shaft.

6. An apparatus as defined in claim 1 including a fluid agitator in said tank and below said given level, said agitator comprising: a head having at least one outlet orifice, a trackway parallel to the axis of said workpiece received by said support, a conduit means for directing quenching fluid to said outlet orifice and means for selectively moving said agitator along said track and within said tank to a position aligned with a bearing surface being quenched.

7. An apparatus as defined in claim 6 wherein said head has an arcuate contour generally matching said bearing surface and spaced therefrom.

8. An apparatus as defined in claim 6 wherein a plurality of outlet orifices are provided on said head.

9. An apparatus as defined in claim 6 wherein said means for selectively moving said agitator includes a feed screw rotatably mounted in said tank and on a fixed axis and a nut for receiving said screw secured onto said agitator.

10. An apparatus as defined in claim 6 wherein said inductor is movable axially of said workpiece received by said support, and means for moving said inductor, in synchronization with said agitator moving means.

11. An apparatus as defined in claim 1 wherein said inductor is supported on a pantograph lever system, and means for pivoting said inductor against a workpiece bearing surface whereby, as said workpiece rotates, said inductor remains in heating engagement with said bearing surface.

References Cited

UNITED STATES PATENTS

| | | | |
|---|---|---|---|
| 1,953,647 | 4/1934 | Darrah | 266—4 XR |
| 2,787,566 | 4/1957 | Seulen et al. | 266—4 XR |
| 2,894,519 | 7/1959 | Gregg | 134—160 XR |
| 3,101,165 | 8/1963 | Barkley et al. | 266—4 |
| 3,240,480 | 3/1966 | Cary | 266—4 |

J. SPENCER OVERHOLSER, *Primary Examiner.*

R. S. ANNEAR, *Assistant Examiner.*